United States Patent [19]

Tucci

[11] 4,038,944
[45] Aug. 2, 1977

[54] ARTIFICIAL BEDDING MATERIAL FOR ANIMALS

[76] Inventor: Frank J. Tucci, 16 Lujune Road, Cinnaminson, N.J. 08077

[21] Appl. No.: 618,050

[22] Filed: Dec. 22, 1975

[51] Int. Cl.² .............................................. A01K 29/00
[52] U.S. Cl. .......................................... 119/1; 119/28
[58] Field of Search ........................ 119/1, 19, 22, 28

[56] References Cited

U.S. PATENT DOCUMENTS

| 3,326,186 | 6/1967 | Doll | 119/19 |
|---|---|---|---|
| 3,641,983 | 2/1972 | Keen et al. | 119/19 X |
| 3,765,371 | 10/1973 | Fisher | 119/1 |
| 3,822,673 | 7/1974 | Benny | 119/22 |

FOREIGN PATENT DOCUMENTS

| 2,102,084 | 7/1972 | Germany | 119/28 |

*Primary Examiner*—Hugh R. Chamblee
*Attorney, Agent, or Firm*—Paul & Paul

[57] ABSTRACT

A reuseable synthetic plastic is provided for use as animal bedding and use in animal bedding systems to facilitate removal of excretory materials, the bedding comprising substantially impermeable hydrophobic elongate plastic pieces which can also be used in combination with means for disposing of the liquid excretory material.

9 Claims, 6 Drawing Figures

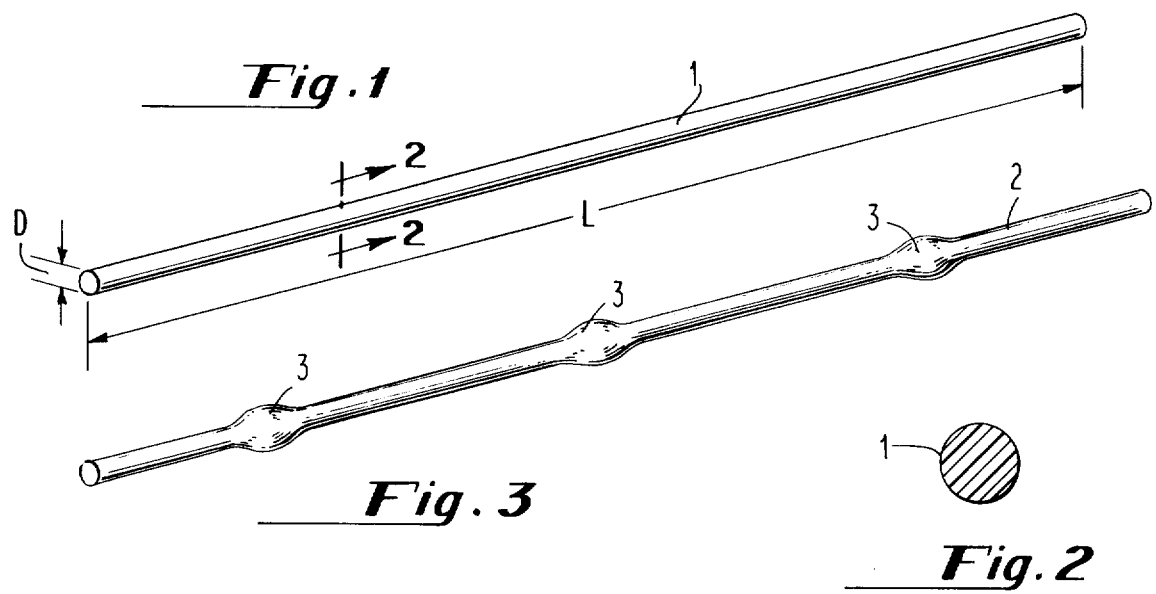
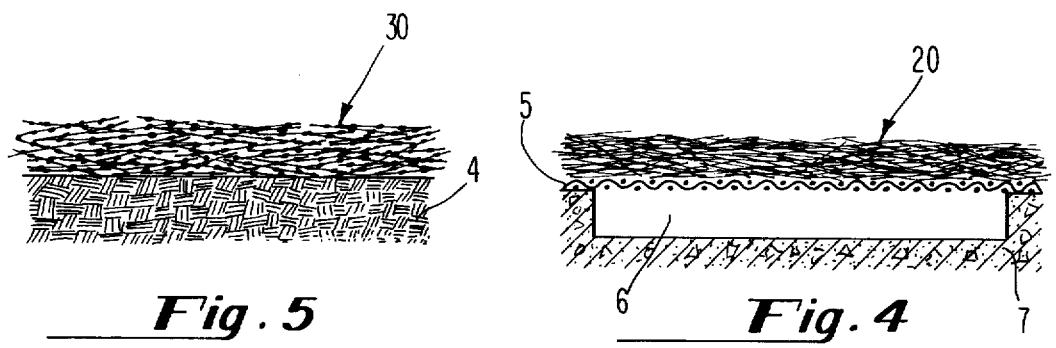
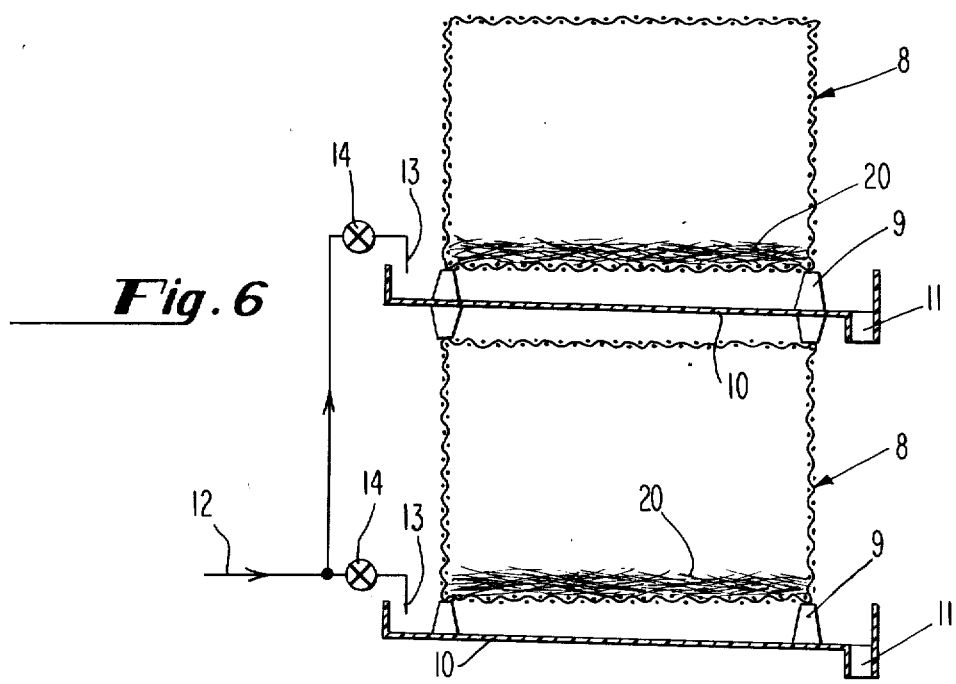

ARTIFICIAL BEDDING MATERIAL FOR ANIMALS

SUMMARY OF THE INVENTION

This invention relates to artificial bedding material for animals, and further relates to the use of such artificial bedding material in improved animal bedding systems.

It is known to utilize natural bedding materials such as straw and wood shavings for bedding animals such as horses, cattle, domestic pets, laboratory animals and the like. The disadvantages of such materials are numerous. Straw and wood shavings present fire hazards. Straw and wood shavings are prone to being accompanied by dust, dirt and organisms which are not conducive to the health or psychological well being of the animals. Straw and wood shavings are naturally absorbent materials which unfortunately retain liquid excretory material from the animals, and therefore require regular replacement of the spoiled bedding. In recent years, by-products of natural crops such as straw have become uneconomical because of a reduction in certain crop plantings and inflation. Additionally, natural bedding material must be replaced periodically and is not reusable.

Substitutes for natural bedding materials for animals have been suggested. Synthetic materials in the form of mats or cast floors have been disclosed. Some of these systems are subject to destruction by the animals' hoofs, while others tend to accumulate excretory material on their underside, causing a disposal problem.

Directly associated with the problem of the animal bedding itself is the problem of disposing of and masking the odor of animal excretory material. With some animals such as horses, cattle and laboratory animals, the animmals' bed or stall is also the place of elimination of excretory material. Other animals, such as domestic animals are not prone to eliminating in their bedding and are normally trained to use materials conventionally known as litter for such purpose. Litter has been produced of natural and synthetic materials, both organic and inorganic, and always has one or more of the following characteristics: absorbence, odor masking, bacteriostatic. Additionally litter is normally made from materials that do not tend to be readily moved about from the place of elimination, such as dense minerals or mineral like substances.

It is an object of this invention to provide a novel animal bedding material that is reusable.

It is another object of this invention to provide a novel animal bedding material that is nonflammable and nontoxic.

It is another object of this invention to provide a novel animal bedding material that is economical.

It is another object of this invention to provide a novel animal bedding material which is comfortable to animals that lay in their bedding.

It is another object of this invention to provide a novel animal bedding system which facilitates cleaning and making of the bedding.

It is another object of this invention to provide a novel animal bedding system which facilitates removal of liquid animal excretory material from the animal bed.

Some of the foregoing objects of the invention are accomplished by the novel bedding material of this invention which comprises a plurality of elongate pieces of a nonflammable, nontoxic, hydrophobic, impermeable synthetic plastic material. Two embodiments of this material have been discovered, one having a generally smooth surface and the other having protuberances formed thereon which facilitate the maintenance of a comfortable animal bed.

Other objects of this invention are accomplished by the novel bedding system of this invention which comprises in combination a perforate bed floor having arranged thereon bedding material consisting essentially of a plurality of the novel bedding materials of this invention, wherein the floor is mounted in spaced relationship to a structure adapted to receive or discharge liquids.

Other objects and advantages of the present invention will be readily apparent to those skilled in the art from the reading of the following brief descriptions of the drawing figures, detailed description of the preferred embodiment, and the appended claims.

DESCRIPTION OF THE DRAWINGS

FIG. 1 is a perspective view of a single piece of an embodiment of the bedding material of this invention.

FIG. 2 is a sectional view taken generally along the line 2—2 of FIG. 1.

FIG. 3 is a perspective view of a single piece of another embodiment of the bedding material of this invention.

FIG. 4 is a side elevational view of an embodiment of the bedding system of this invention.

FIG. 5 is a side elevational view of another embodiment of the bedding system of this invention.

FIG. 6 is a side elevational view of still another embodiment of the bedding system of this invention.

DETAILED DESCRIPTION

The animal bedding of this invention is basically a synthetic replacement for such materials as straw. The fundamental element of this novel bedding is an elongate piece of synthetic plastic which is impermeable, nonflammable and nontoxic to animals.

In the preferred embodiment, the elongate piece of synthetic plastic is constructed so that the ratio of the length (L) to the largest width (D) of the piece is at least approximately 40:1. This parameter was determined to be that which is most suitable for larger animals, and may be altered to the extent it is consistent with providing a comfortable source of bedding as dictated by different sizes and types of animals. It is desirable for these elongate pieces to position themselves relatively parallel to the ground or bottom surface of the particular system, thus minimizing discomfort to the animal due to bedding materials tending not to conform to the shape of the particular animal and due to bedding materials which could possibly protrude into or otherwise irritate the animal. It is obvious then, that the length of the elongate piece, and therefore the above mentioned ratio may vary depending upon the animal, and in the preferred embodiment, the length of a piece of bedding would be at least five inches (5 inches) for horses. Of course, the length of the elongate piece varies depending upon the animal, the type of bedding system in which it is to be incorporated, the various kinds of excretory matter which is to be accommodated, and other obvious parameters which are apparent to one skilled in the art.

One embodiment of the piece of bedding of this invention is shown in FIG. 1 as an elongated cylindrical piece 1. Piece 1 being a substantially impermeable hydrophobic plastic piece which is smooth surfaced, may be formed by conventional extrusion processes wherein plastic materials are continuously extruded from a dye, after which a cutting operation may produce the piece 1 as shown. Examples of nonflammable extrusible plastics are nylon and polyethylene, however, any thermoplastic or thermosetting plastic which is nonflammable in the solid state or can be rendered nonflammable would be suitable. Polyvinyl chlorides are another example of extrusible plastics, and can be rendered substantially impermeable and hydrophobic, nonflammable, and nontoxic. C. Schildkecht, Vinyl and Related Polymers, pp. 386–445 (1952).

Another embodiment of the piece of bedding of this invention is shown in FIG. 3. Piece 2 is produced similarly to piece 1 of FIG. 1, except that the cross section thereof has been varied by conventional extrusion technology to form nodules 3. Varying the cross section of extruded piece 2, commonly called "surging", can be accomplished by varying the take-off speed of the extruder, the pressure in the die, or the temperature. A. Griff, Plastics Extrusion Technology, pp. 270 (2d ed. 1962). The advantage of using piece 2 of the bedding material of this invention is that such pieces do not tend to conglomerate or pack in the bed as do natural or smooth surfaced materials. In this manner, a springier, more comfortable bed may be maintained for the animal. Moreover, the many voids between the pieces bedding material provide for improved air circulation in the bedding. The present invention utilizes a plurality of pieces in the same manner as straw would be conventionally used for bedding systems. Of course, either the smooth surface pieces 1 or the nodular pieces 2 may be utilized as bedding in various bedding systems; certainly, reference to one embodiment of the piece is only illustrative, and will not preclude the substitution of the other embodiment. The choice between smooth and nodular pieces, or a combination thereof, will be determined by the particular applications involved. It is obvious that a plurality of plastic pieces may be used in combination with various means for disposing of the liquid excretory material. The embodiments which follow are illustrative of such disposal means which can run the gamut, from relatively simple devices, commonly practiced, to elaborate mechanisms obvious to one skilled in the art.

In the common case of horses and cattle, upon elimination by the animal, liquid excretory material will not adhere or be absorbed by the substantially impermeable hydrophobic plastic pieces, but will drain into the ground. At periodic intervals, a groom or other stable hand will clean dry waste from the bedding conventionally with a pitch fork or similar implement. Since the bedding pieces have not absorbed liquid waste, this cleaning operation is facilitated so that a minimal amount of the bedding need be removed with the dry waste. Such dry waste with some associated bedding pieces may then be screened or otherwise culled to remove the plastic pieces before the dry waste becomes manure. The recovered pieces may then be washed and dried and recycled as fresh bedding each time a bed is cleaned, and for this purpose, a supply of clean and dry pieces will be kept in reserve.

FIG. 5 illustrates the use of nodular pieces 2 arranged to form a bed 30 over the ground 4. In such an arrangement, the liquid excretory material will filter down through the bed 30 and be absorbed into the ground 4. Another embodiment, shown in FIG. 4, discloses a method whereby the liquid excretory material filters down through a bunch of smooth surfaced pieces forming bed 20, through a permeable support screen 5, and into trough 6. This embodiment could be used if surface 7 were other than an absorbent soil or was in fact made of concrete or other nonabsorbent material. Screen 5 will be made from any material capable of supporting the animal, preventing the plastic pieces from entering trough 6, and yet allow the liquid waste to pass therethrough. Trough 6 will be used to contain the liquid excretory material. The trough will be made of any appropriate material suitable for such a purpose, an example being stainless steel, and could be slanted to carry the liquid waste into an open drain, or could be provided with any conventional plumbing drainage system to carry away the liquid material. In addition, an automatic liquid flushing system (not shown) could be provided to periodically wash trough 6 and therefore eliminate odor, bacteria, etc.

FIG. 6 shows still a further embodiment utilizing bedding 20 in an animal bedding system. Here, standard cages 8 may be utilized, or in fact, any suitable animal enclosure can be utilized. In this embodiment the bedding 20 is arranged on the floor of cage 8, so that the liquid excretory material passing through bedding 20 and the floor of cage 8, which is similar to the permeable support screen 5 of FIG. 4, is deposited into a slanted drain pan 10. This embodiment allows the excretory material to drain into trough 11 which in turn can be drained into conventional plumbing systems and/or drains (not shown). Cage 8 is elevated from and above drain pan 10, being supported by support legs 9 which can be made of any suitable material. Any number of such support legs 9 could be utilized to support the floor of cage 8 depending on the size and weight of the particular animal being housed. Preferably a nonabsorbent material would be used for support legs 9, examples being plastics of the type used in the elongate pieces as disclosed above. Also, any number of cages 8 may be stacked vertically as shown in FIG. 6, and additionally the surface area of slanted drain pan 10 may be increased so that it could accommodate any number of cages 8 arranged side by side, relatively horizontal to each other. Moreover, a standard sanitizing liquid solution and/or water from inflow source 12 could be provided with spigot means 13 to direct such liquid into drain pan 10 and facilitate washing and/or sanitizing slanted drain pan 10 and to thereby flush the liquid animal excretory material into trough 11. As shown in FIG. 6, on-off valves 14 are provided to selectively control when drain pans 10 are to be washed. Of course, automatic washing means could be provided which could be cycled at predetermined time intervals.

It will be apparent from the foregoing that various modifications may be made in the embodiments of the present invention, as regards structural features, and as regards their use in a variety of bedding and excretory elimination systems, all within the spirit and scope of the invention as described and claimed, to one skilled in the art.

What is claimed is:

1. Reusable synthetic plastic animal bedding being nonflammable and nontoxic, said animal bedding facilitating removal of liquid animal excretory material from the animal bed by permitting liquid excretory material to flow freely through said animal bedding while retaining solid excretory material comprising a plurality of elongate pieces of substantially impermeable hydrophobic synthetic plastic, randomly positioned relative to each other to form said bedding, whereby selected elongate pieces may be individually and readily removed from said animal bedding to facilitate said removal of animal excretory material.

2. Animal bedding of claim 1 wherein said elongate plastic pieces have continuously varying thickness throughout the length thereof.

3. Animal bedding of claim 1 wherein the ratio of length to width of said elongate plastic pieces is at least approximately 40:1.

4. Animal bedding of claim 1 including in combination therewith a means for disposing of the liquid excretory material.

5. The combination of claim 4 wherein the disposing means comprises a moisture absorbing or permeable surface on which said bedding is arranged.

6. The combination of claim 4 wherein the disposing means includes a trough located below said bedding and a permeable support screen which covers said trough and which supports the bedding and the animal thereby allowing the liquid animal excretory material to flow freely into said trough.

7. The combination of claim 4 wherein the disposing means includes at least one cage having a permeable support floor formed therein for supporting the bedding and the animal, a slanted drain pan into which the liquid animal excretory material filtering down from said cage is deposited, support legs for maintaining said cage in an elevated position relative to said slanted drain pan, and a trough positioned relative to said slanted drain pan to receive the liquid animal excretory material from said slanted drain pan whereby the liquid material which is deposited into said drain pan empties into said trough.

8. The combination of claim 7 including a means for washing said slanted drain pan to facilitate the flushing of liquid animal excretory material into said trough.

9. The combination of claim 7 wherein at least two slanted drain pans and cages are mounted in vertical relation.

* * * * *